(12) United States Patent
Wang

(10) Patent No.: US 10,782,139 B2
(45) Date of Patent: Sep. 22, 2020

(54) METHOD OF PLANNING TRAVEL ROUTE, PLANNING SERVER, AND STORAGE MEDIUM

(71) Applicant: PING AN TECHNOLOGY (SHENZHEN) CO., LTD., Shenzhen (CN)

(72) Inventor: Xiaozhang Wang, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 313 days.

(21) Appl. No.: 15/739,777

(22) PCT Filed: Jun. 30, 2017

(86) PCT No.: PCT/CN2017/091305
§ 371 (c)(1),
(2) Date: Dec. 25, 2017

(87) PCT Pub. No.: WO2018/036275
PCT Pub. Date: Mar. 1, 2018

(65) Prior Publication Data
US 2020/0041288 A1    Feb. 6, 2020

(30) Foreign Application Priority Data
Aug. 23, 2016    (CN) .................... 2016 1 07053051

(51) Int. Cl.
*G01C 21/34*    (2006.01)
*G01C 21/36*    (2006.01)
(Continued)

(52) U.S. Cl.
CPC ....... *G01C 21/343* (2013.01); *G01C 21/3605* (2013.01); *G06Q 10/047* (2013.01); *G06Q 10/1095* (2013.01); *G06Q 50/14* (2013.01)

(58) Field of Classification Search
CPC .............. G01C 21/343; G01C 21/3605; G06Q 10/047; G06Q 10/1095; G06Q 50/14
(Continued)

(56) References Cited

U.S. PATENT DOCUMENTS 8,762,049 B2 *    6/2014    Feng .................... G01C 21/343
                                                                701/411
9,460,120 B2 *    10/2016    Wang .................. G06F 16/4393
(Continued)

FOREIGN PATENT DOCUMENTS

CN    101739617 A    6/2010
CN    101763611 A    6/2010
(Continued)

OTHER PUBLICATIONS

Xin Lu,"Travel Route Planning Based on User-Generated Content"; Chinese Master's Theses Full-text Database Economics and Management Sciences; p. J153-6, Mar. 15, 2012.
(Continued)

*Primary Examiner* — Peter D Nolan
*Assistant Examiner* — Wae L Louie

(57) ABSTRACT

A method of planning a travel route includes: receiving a travel route planning request carrying travel parameters sent by a user terminal and determining travel spots of each travel spot type. If the travel parameters include the correlation data between travel spot types and travel time periods, finding the travel spots of the travel spot type corresponding to each travel spot type. If no correlation data is included, dividing a travel cycle specified in the travel parameters into at least one travel time period; computing a corresponding travel spot touring route for each travel time period based on predetermined mapping relationships between the travel spots of each travel spot type, the touring times and distances between different travel spots of the travel spot type;
(Continued)

and returning the corresponding travel spot touring route to the user terminal. The present invention further discloses a planning server.

12 Claims, 7 Drawing Sheets

(51) Int. Cl.
*G06Q 10/04* (2012.01)
*G06Q 10/10* (2012.01)
*G06Q 50/14* (2012.01)

(58) Field of Classification Search
USPC .......................................................... 701/533
See application file for complete search history.

(56) References Cited

U.S. PATENT DOCUMENTS

| | | | |
|---|---|---|---|
| 2008/0046298 A1 | 2/2008 | Ben-Yehuda et al. | |
| 2013/0268195 A1* | 10/2013 | Tai | G01C 21/343 701/533 |
| 2014/0149157 A1 | 5/2014 | Shaam et al. | |
| 2015/0066649 A1 | 3/2015 | Kumar et al. | |
| 2015/0160030 A1* | 6/2015 | Costello | G01C 21/3461 701/533 |
| 2015/0338219 A1 | 11/2015 | Wang et al. | |
| 2016/0146608 A1* | 5/2016 | Hu | G06Q 10/1093 701/533 |
| 2016/0202076 A1* | 7/2016 | Feng | G01C 21/343 701/408 |
| 2017/0243308 A1* | 8/2017 | Maita | G06Q 30/0631 |
| 2017/0336223 A1* | 11/2017 | Bakshiram | G06Q 20/28 |
| 2018/0112995 A1* | 4/2018 | Bortolussi | H04W 4/021 |
| 2019/0265703 A1* | 8/2019 | Hicok | G05B 13/027 |
| 2020/0041288 A1* | 2/2020 | Wang | G06F 16/00 |

FOREIGN PATENT DOCUMENTS

| | | |
|---|---|---|
| CN | 101963960 A | 2/2011 |
| CN | 105547306 A | 5/2016 |
| EP | 1113374 A2 | 7/2001 |
| JP | 2001188835 A | 7/2001 |
| JP | 200350138 A | 2/2003 |
| JP | 2004309368 A | 11/2004 |
| JP | 2005017206 A | 1/2005 |
| JP | 2015018545 A | 1/2015 |
| KR | 20030039806 A | 5/2003 |
| WO | 2015/094262 A1 | 6/2015 |

OTHER PUBLICATIONS

Search Report of counterpart European Patent Application No. 17804790.8 dated Jan. 15, 2020.

* cited by examiner

METHOD OF PLANNING TRAVEL ROUTE, PLANNING SERVER, AND STORAGE MEDIUM

CROSS REFERENCE TO RELATED APPLICATIONS

This application is the national phase entry of International Application No. PCT/CN2017/091305, filed on Jun. 30, 2017, which is based on and claims priority to Chinese Patent Application No. CN2016107053051, filed on Aug. 23, 2016, the entire contents of which are incorporated herein by reference.

TECHNICAL FIELD

This disclosure relates generally to computer technology, and more particularly relates to a method of planning a travel route, a planning server, and a storage medium.

BACKGROUND

An existing travel client program usually cannot provide clients with very specific travel route plans for different time periods, and the travel route plans, when provided, are usually not reasonable, resulting in a lot of time spent on the journeys between attractions and making it easy to miss a lot of attractions on the planned routes.

SUMMARY

To achieve the above objective, a method of planning a travel route is provided according to a first aspect of the disclosure, the method including: receiving, by a planning server, a travel route planning request carrying travel parameters that is sent by a user terminal; if the travel parameters include the correlation data between a travel region and travel spot types and travel time periods, determining the travel spots of each travel spot type in the travel region, and finding the travel spots of the travel spot type corresponding to each travel time period based on the correlation data; and computing a travel spot touring route corresponding to each travel time period according to a preset computation rule based on predetermined mapping relationships between the travel spots of each travel spot type with touring times as well as the distances between different travel spots of the travel spot type, and returning the travel spot touring route to the user terminal; otherwise if the travel parameters include a travel region and a travel cycle without including the correlation data between the travel spot types and the travel time periods, then determining the travel spots of each travel spot type in this travel region, dividing the travel cycle into at least one travel time period according to a preset division rule, and computing a travel spot touring route corresponding to each travel time period according to a preset computation rule based on predetermined mapping relationships between the travel spots of each travel spot type with touring times as well as the distances between different travel spots of the travel spot type, and further returning the travel spot touring route to the user terminal.

In order to achieve the above-described objective, a planning server is also provided according to a second aspect of the disclosure, the planning server including a memory and a processor coupled to the memory, the memory storing at least one computer-readable instruction executable by the processor to perform the following operations: receiving a travel route planning request carrying travel parameters that is sent by a user terminal; if the travel parameters include the correlation data between a travel region and travel spot types and travel time periods, determining the travel spots of each travel spot type in the travel region, and finding the travel spots of the travel spot type corresponding to each travel time period based on the correlation data; and computing a travel spot touring route corresponding to each travel time period according to a preset computation rule based on predetermined mapping relationships between the travel spots of each travel spot type with touring times as well as the distances between different travel spots of the travel spot type, and further returning the travel spot touring route to the user terminal; otherwise if the travel parameters include a travel region and a travel cycle without including the correlation data between travel spot types and travel time periods, then determining the travel spots of each travel spot type in this travel region, dividing the travel cycle into at least one travel time period according to a preset division rule, and computing a travel spot touring route corresponding to each travel time period according to a preset computation rule based on predetermined mapping relationships between the travel spots of each travel spot type with the touring times as well as the distances between different travel spots of the travel spot type, and further returning the travel spot touring route to the user terminal.

In order to achieve the above-described objective, a computer-readable storage medium is further provided according to a third aspect of the disclosure, the computer-readable storage medium having stored thereon at least one computer instruction executable by a processor to perform the following operations: receiving a travel route planning request carrying travel parameters that is sent by a user terminal; if the travel parameters include the correlation data between a travel region and travel spot types and travel time periods, determining the travel spots of each travel spot type in the travel region, and finding the travel spots of the travel spot type corresponding to each travel time period based on the correlation data; and computing a travel spot touring route corresponding to each travel time period according to a preset computation rule based on predetermined mapping relationships between the travel spots of each travel spot type and the touring times as well as the distances between different travel spots of the travel spot type, and further returning the travel spot touring route to the user terminal; otherwise if the travel parameters include a travel region and a travel cycle without including the correlation data between the travel spot types and the travel time periods, determining the travel spots of each travel spot type in the travel region, dividing the travel cycle into at least one travel time period according to a preset division rule, and computing a travel spot touring route corresponding to each travel time period according to a preset computation rule based on predetermined mapping relationships between the travel spots of each travel spot type and the touring times as well as the distances between different travel spots of the travel spot type, and further returning the travel spot touring route to the user terminal.

According to the method of planning a travel route, the planning server, and the storage medium provided by this disclosure, the planning server can base on the travel parameters included in the user's travel route planning request to determine the travel spots of each travel spot type in the travel region indicated in the travel parameters, and compute a travel spot touring route corresponding to each travel time period according to a preset computation rule based on predetermined mapping relationships between the travel spots of each travel spot type with the touring times as well as the distances between different travel spots of the travel spot type, and further return the computed travel spot touring route corresponding to each travel time period to the user terminal. Since for the travel spot type corresponding to each travel time period, the travel spots the user is going to tour and the touring time of each travel spot as well as the distances between different travel spots are comprehensively considered in computation of the travel spot touring route corresponding to each travel time period, a specific travel spot touring route for each travel time period in the user's travel can be recommended to user, providing the user with reasonable and detailed travel route plans and thus improving the user's travel experience.

Objects, functional features, and advantages of this disclosure will be described below in further detail in connection with embodiments and the accompanying drawings.

DETAILED DESCRIPTION OF THE INVENTION

It will be appreciated that the specific embodiments described herein are merely illustrative of the disclosure and are not intended to limit the disclosure.

Figure 1:
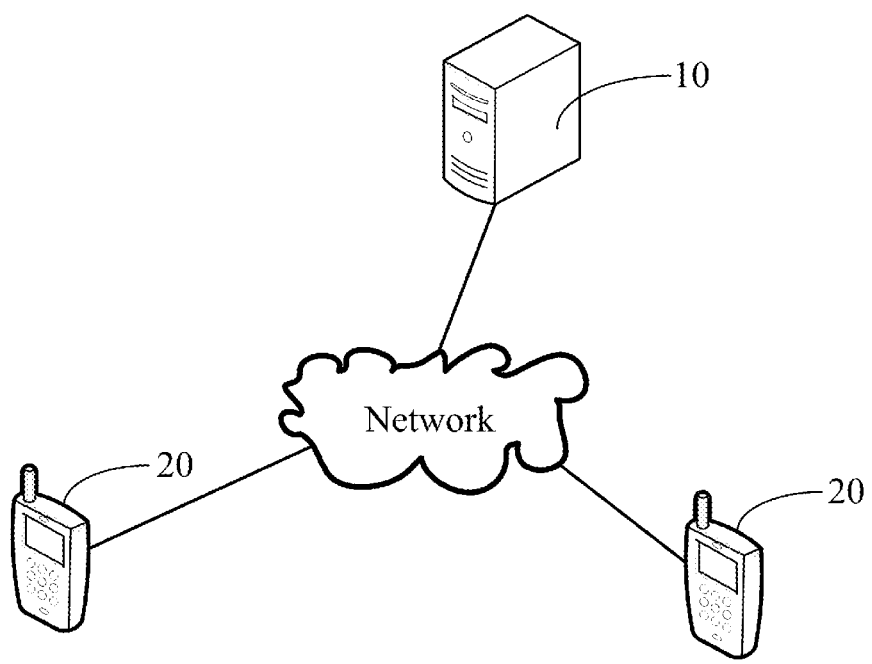
FIG. 1 is an illustrative hardware operating environment for methods of planning a travel route in accordance with various embodiments of the disclosure.
Figure 3:
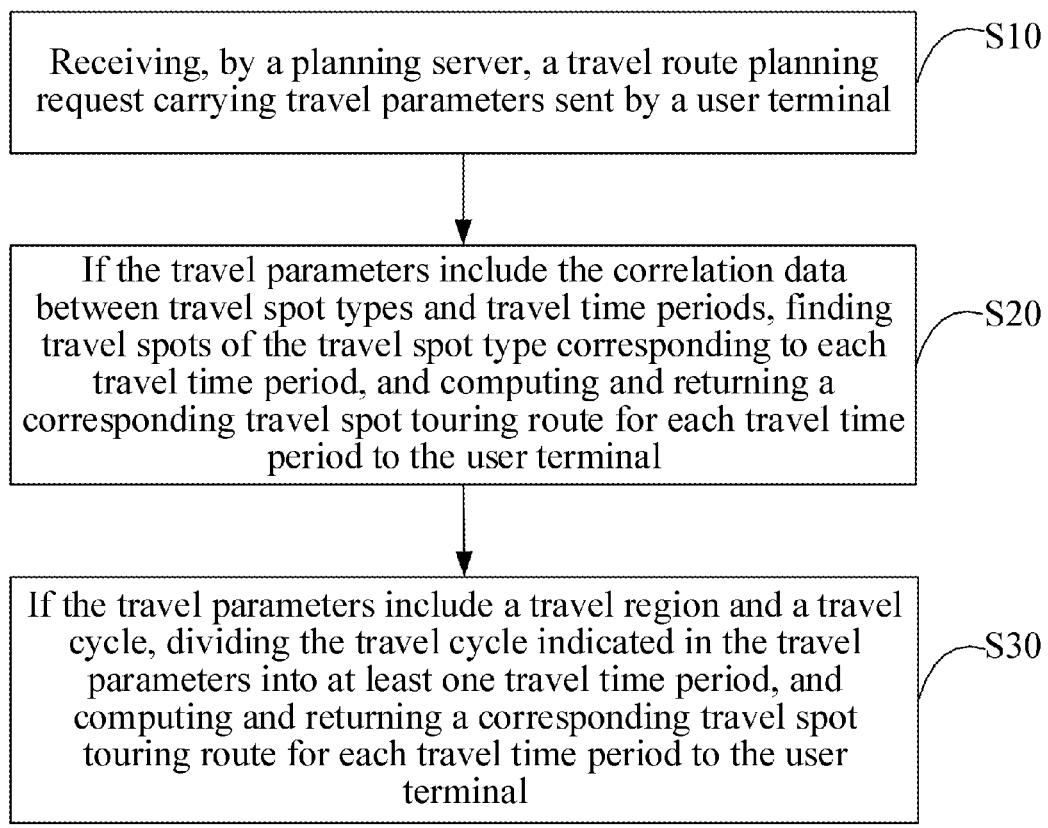
FIG. 3 is an illustrative flowchart of a first embodiment of a method of planning a travel route in accordance with the disclosure.
Figure 4:
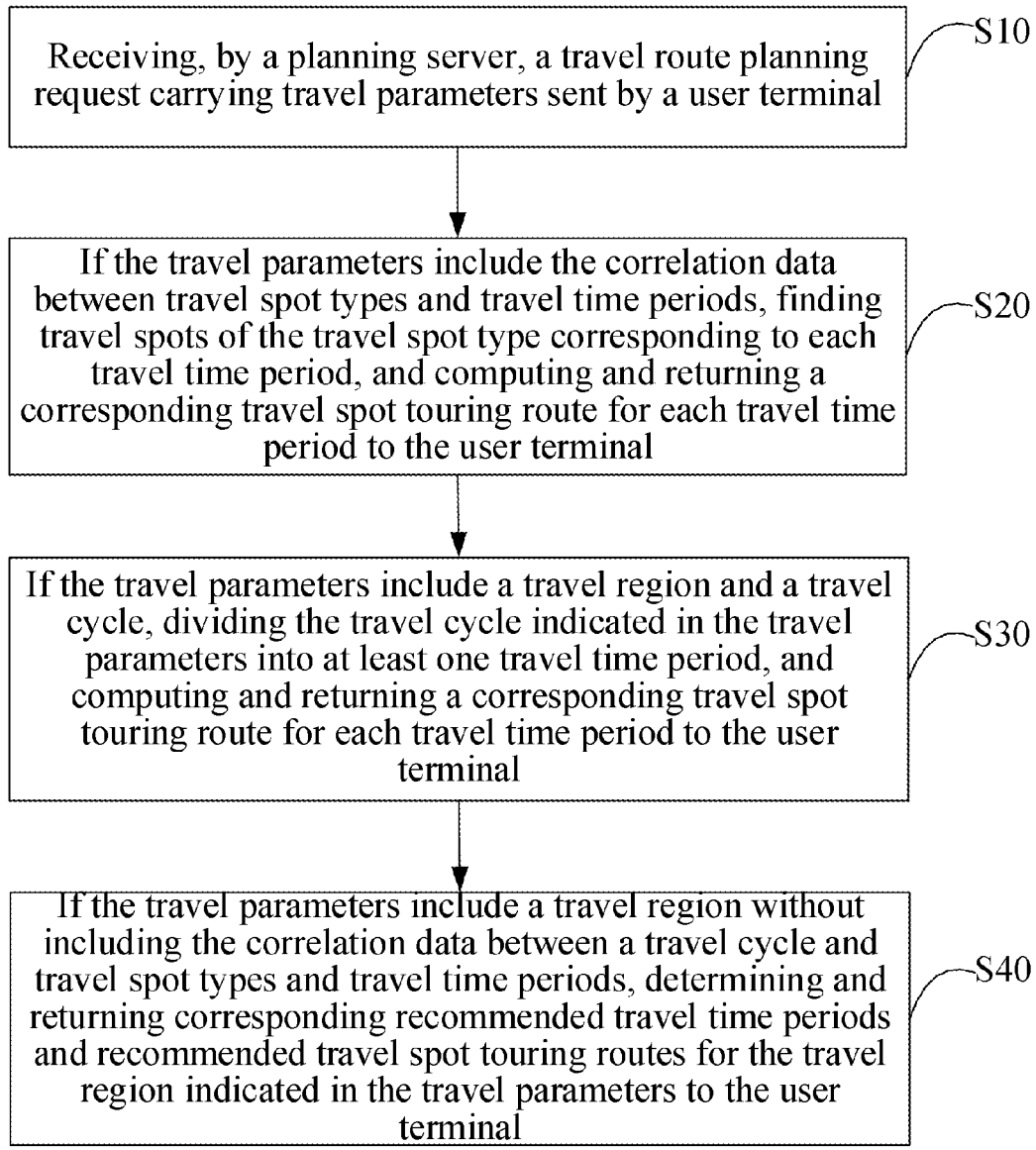
FIG. 4 is an illustrative flowchart of a second embodiment of a method of planning a travel route in accordance with the disclosure.
Figure 5:
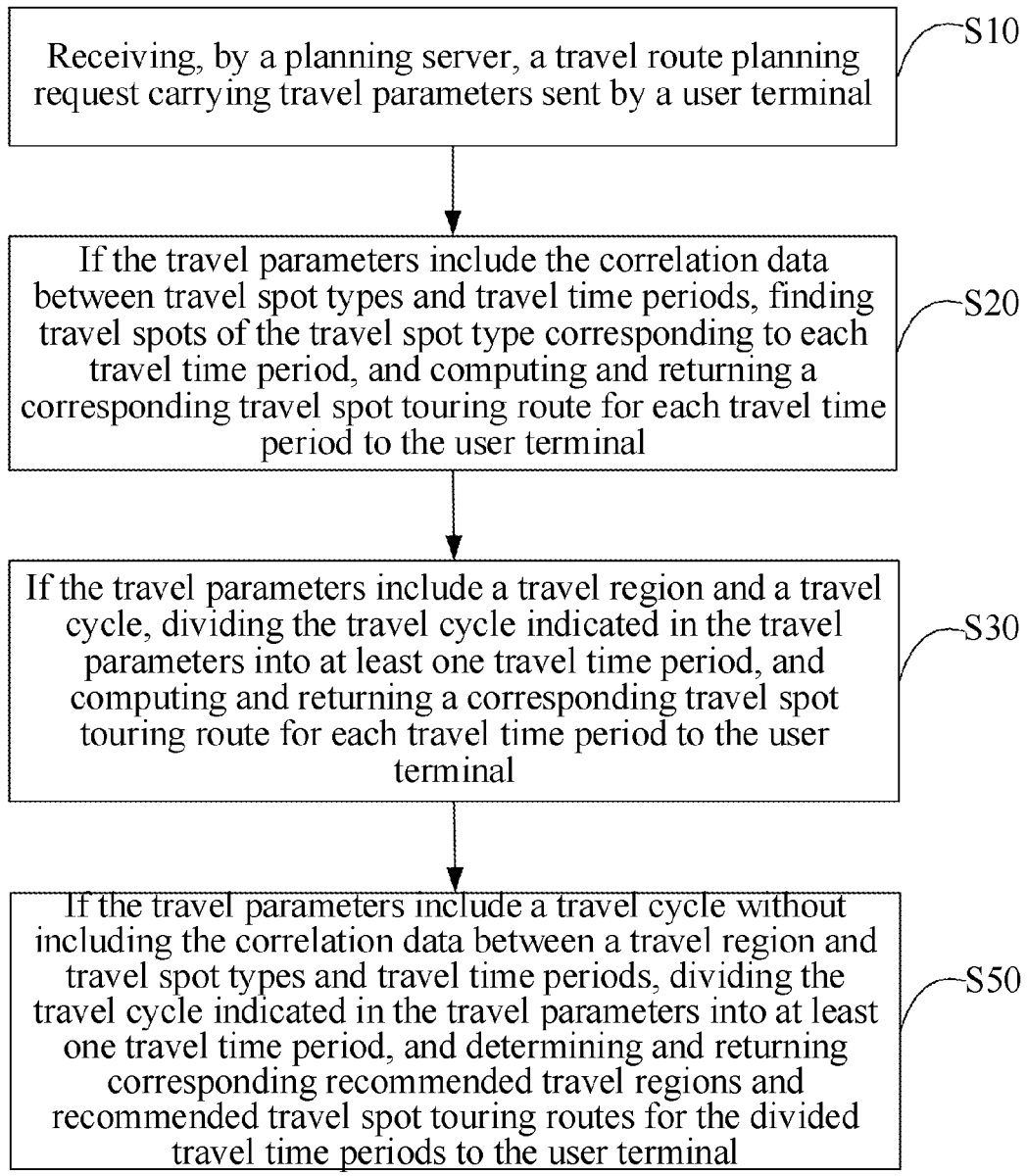
FIG. 5 is an illustrative flowchart of a third embodiment of a method of planning a travel route in accordance with the disclosure.

FIG. 1 illustrates a hardware operating environment for a method of planning a travel route according to any of the embodiments of FIGS. 3-5. The hardware operating environment may include a planning server 10 and at least one user terminal 20 that communicates and interacts with the planning server 10.

The user terminal 20 may be a smart terminal such as a mobile phone, a tablet computer, a personal digital assistant (PDA), a wearable device (e.g., a smart watch, smart glasses, etc.), or any other suitable electronic device. The user terminal can communicate and interact with the planning server 10 through the Internet, wide area networks (WAN's), metropolitan area networks (MAN's), local area networks (LAN's), virtual private networks (VPN's), or the like.

Figure 2:
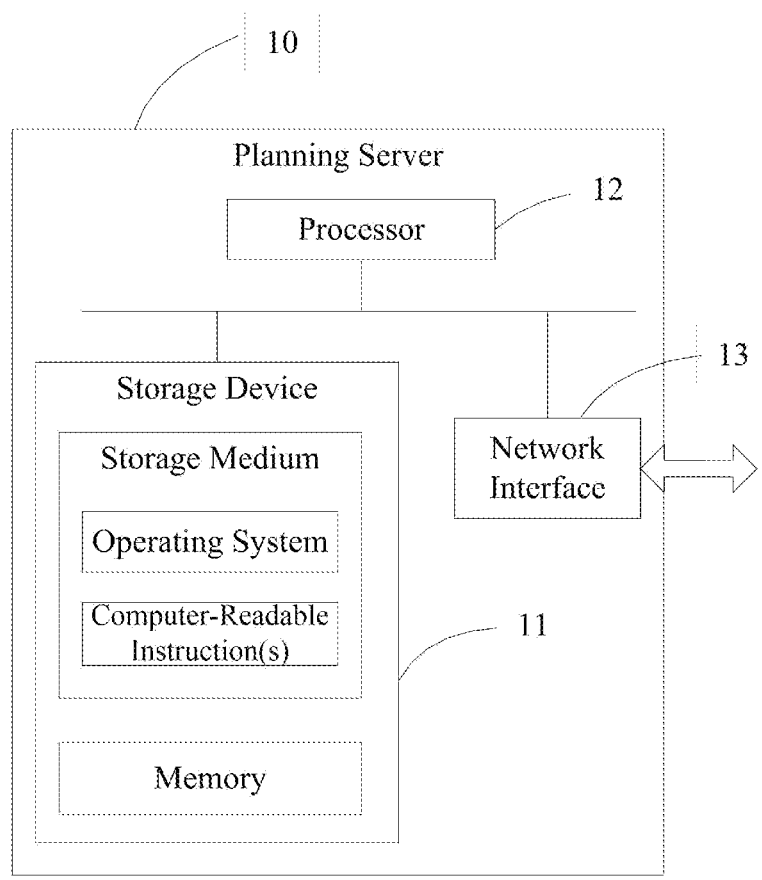
FIG. 2 is an illustrative configurational diagram of a travel planning server in accordance with an embodiment of the disclosure.

The planning server 10 can automatically perform numerical calculations and/or information processing according to instructions set or stored in advance. As illustrated in FIG. 2, the planning server 10 may include a processor 12, a storage device 11, and a network interface 13 that are coupled through a system bus. The processor 12 is configured for providing computing and control capabilities to support the operation of the planning server 10, and may include one or more microprocessors, digital processors, or the like. The storage device 11 is configured for storing various types of data and computer-readable instructions required by the server 10 to implement a specific function or operation, and may include a memory and at least one storage medium. The memory provides a cache environment for the operation of the planning server 10. The storage medium stores an operating system, various types of data, and at least one computer-readable instruction executable by the processor 12 to implement the travel route planning methods according to various embodiments of the present application. The network interface 13 is configured for exchanging data with the user terminal 20 under the instruction of the processor 12, e.g., receiving a travel route planning request from the user terminal 20 and returning the planned travel route to the user terminal 20.

It can be understood that the above storage medium may be a non-volatile storage medium such as a ROM, an EPROM, or a flash memory.

It will be appreciated that the configuration shown in FIG. 2 is a block diagram of merely a partial configuration of the planning server 10 that is relevant to the solution of the present application, and will not constitute a limitation on the planning server 10. In different embodiments, the planning server 10 may include more or fewer components than shown in the figures, or combine certain components or have different component arrangements. For example, in one embodiment, the planning server 10 may further include an input device, a display screen, a sound capture device, and the like.

In this embodiment, after receiving the travel route planning request from the user terminal 20, the planning server 10 may store it in the memory 12 and execute the computer-readable instructions in the memory 12 through the processor 12 to implement the methods of planning a travel route in accordance with various embodiments of the present application.

FIG. 3 is an illustrative flowchart of a first embodiment of a method of planning a travel route in accordance with the disclosure.

In the first embodiment, the method of planning a travel route may include the following process that begins at step S10.

In step S10, a planning server receives a travel route planning request carrying travel parameters sent from a user terminal.

In this embodiment, when a user needs to plan a travel route, the user can send a travel route planning request carrying travel parameters through a user terminal (e.g., a mobile phone, a tablet computer, etc.) to the planning server.

As one implementation, a travel route planning client program may be pre-installed in the user terminal. The user may input the travel parameters through a travel route planning operation interface provided by the travel route planning client program, and then send the travel route planning request carrying the travel parameters through the travel route planning client program to the planning server. As another implementation, a browser system may be pre-installed in the user terminal. The user can access the planning server through the browser system and receive a travel route planning operation interface returned from the planning server to input the travel parameters based on the travel route planning operation interface, and then send the travel route planning request carrying the travel parameters to the planning server through the browser system.

After receiving the travel route planning request carrying the travel parameters sent from the user terminal, the planning server may analyze the travel parameters to determine the travel spots of each travel spot type in the travel region indicated in the travel parameters. For example, the travel parameters may include one or more travel related parameters entered by the user, including but not limited to the following parameters: the travel region, e.g., city, scenic area, island; travel spot types, e.g., humanity, shopping, food; travel spots of each travel spot type, e.g., the humanity-type travel spots may include museums, naval batteries, memorial halls, amusement parks, zoos, etc., the shopping-type travel spots may include shopping malls, duty-free shops, pedestrian streets, etc., and the food-type travel spots may include food streets, specialty snacks, century-old restaurants, food courts, etc.; and the travel cycle, e.g., "10:00 May 1, 2016 to 16:00 May 5", or the like.

In this embodiment, the planning server can directly acquire the specific travel spots of each travel spot type in the travel region indicated in the travel parameters which are entered by the user. Or, after acquiring the travel region and/or each travel spot type specified in the travel parameters entered by the user, the planning server can also perform automatic searching and matching based on the travel region and/or each travel spot type specified in the user-entered travel parameters so as to obtain the corresponding travel spots of each travel spot type, but the disclosure won't be limited thereto. The method may then proceed to step S20.

In step S20, if the travel parameters include the correlation data between a travel region and travel spot types and travel time periods, the travel spots of each travel spot type in this travel region are determined, and the travel spots of the travel spot type corresponding to each travel time period are found based on the correlation data. Further, a travel spot touring route corresponding to each travel time period is computed according to a preset computation rule based on predetermined mapping relationships between the travel spots of each travel spot type with touring times as well as the distances between different travel spots of the travel spot type, and the travel spot touring route is then returned to the user terminal.

If the user-entered travel parameters acquired by the planning server include the correlation data between the travel spot types and the travel time periods, then it indicates that the user has defined in the travel parameters the correspondences between different travel time periods and different travel spot types based on different travel time periods in the travel itinerary. For example, the humanity type may be associated with time period A, e.g., "8:00-18:00 of date", the shopping type may be associated with time period B, while the food type may be associated with period C. Thus, based on the correlation data between different travel spot types and travel time periods defined by the user, the planning server can find the travel spots of the travel spot type corresponding to each travel time period. In this embodiment, the mapping relationships between the travel spots of each travel spot type and the touring times may be determined in advance. For example, the corresponding touring time of each travel spot can be determined in advance according to the actual touring requirements or by performing big data analysis on the touring data of all the users. For a humanity-type travel spot "museum", for example, the corresponding touring time can be determined in advance and may be "2 hours" and/or "8:00-10:00", etc., but the disclosure won't be limited thereto.

Therefore, based on the predetermined mapping relationships between the various travel spots of each travel spot type and the touring times as well as the distances between different travel spots of the travel spot type, the touring times of the various travel spots and the distances between different travel spots are comprehensively considered to compute the travel spot touring route corresponding to each travel time period according to a preset computation rule. For example, based on the touring time allowed by a same travel time period, a number of travel spots, the total touring time of which does not exceed the allowable touring time and which won't end up in an exceedingly long itinerary or crossings, can be selected. Then, a travel spot touring route through these selected travel spots can be computed for this travel time period, where, however, other computation methods can of course also be used to compute the corresponding travel spot touring route for each travel time period, which won't be limited herein.

After computing the travel spot touring route for each travel time period, the planning server may then return the computed travel spot touring route for each travel time period to the user terminal so that the user can refer to the computed travel spot touring route to carry out the corresponding tour route planning for each travel time period, and thereby arrange an efficient tour plan. The method may continue to step S30.

In step S30, if the travel parameters include a travel region and a travel cycle without including the correlation data between the travel spot types and the travel time periods, then the travel spots of each travel spot type in this travel region are determined, and the travel cycle is divided into at least one travel time period according to a preset division rule, and further a travel spot touring route for each travel time period is computed according to a preset computation rule based on predetermined mapping relationships between the travel spots of each travel spot type with the touring times as well as the distances between different travel spots of the travel spot type. Finally the travel spot touring route is returned to the user terminal.

If the user-entered travel parameters acquired by the planning server include no correlation data between the travel spot types and the travel time periods, indicating the user hasn't divided the travel cycle into different travel time periods, then the planning server may divide the travel cycle specified in the travel parameters into at least one travel time period according to a preset division rule. For example, if the travel cycle is from 10:00 May 1, 2016 to 16:00 May 5, then the travel cycle may be divided into different time periods by different dates, or other division methods can also be used to divide the travel cycle into different travel time periods, which however won't be limited herein.

In this embodiment, the mapping relationships between the travel spots of each travel spot type and the touring times may be determined in advance. For example, the corresponding touring time of each travel spot can be determined in advance according to the actual touring requirements or by performing big data analysis on the touring data of all the users. For a humanity-type travel spot "museum", for example, the corresponding touring time can be determined in advance and can be "2 hours" and/or "8:00-10:00", etc., but the disclosure won't be limited thereto.

Therefore, based on the predetermined mapping relationships between the various travel spots of each travel spot type and the touring times as well as the distances between different travel spots of the travel spot type, the touring times of the various travel spots and the distances between different travel spots are comprehensively considered to compute the travel spot touring route for each travel time period according to a preset computation rule, and these travel spot touring routes are further taken as the corresponding travel spot touring route for each travel time period obtained through the division of the travel cycle. For example, based on the touring time allowed by a same travel time period, a number of travel spots, the total touring time of which does not exceed the allowable touring time and which won't end up in an exceedingly long itinerary or crossings, can be selected. Then, a travel spot touring route through these selected travel spots can be computed for this travel time period, where, however, other computation methods can of course also be used to compute the corresponding travel spot touring route for each travel time period, which won't be limited herein.

After computing the corresponding travel spot touring route for each travel time period, the planning server may return the computed travel spot touring route for each travel time period to the user terminal so that the user can refer to the computed travel spot touring route to carry out the corresponding tour route planning for each travel time period, and thereby arrange an efficient tour plan.

According to this embodiment, the planning server can base on the travel parameters included in the user's travel route planning request to determine the travel spots of each travel spot type in the travel region indicated in the travel parameters, and compute a corresponding travel spot touring route for each travel time period according to a preset computation rule based on predetermined mapping relationships between the travel spots of each travel spot type with the touring times as well as the distances between different travel spots of the travel spot type, and further return the computed travel spot touring route for each travel time period to the user terminal. Since for the travel spot type corresponding to each travel time period, the travel spots the user is going to tour and the touring time of each travel spot as well as the distances between different travel spots are comprehensively considered in computation of the corresponding travel spot touring route for each travel time period, a specific travel spot touring route for each travel time period during the user's travel can be recommended to user, providing the user with reasonable and detailed travel route plans and thus improving the user's travel experience.

As illustrated in FIG. 4, a second embodiment of the disclosure also provides a method of planning a travel route, which further comprises the following steps on the basis of the above embodiment.

In step S40, if the travel parameters include a travel region without including the correlation data between a travel cycle and travel spot types and travel time periods, then the predetermined correlation data between travel regions, recommended travel time periods, and recommended travel spot touring routes is based on to determine corresponding recommended travel time periods as well as recommended travel spot touring routes in the travel region specified in the travel parameters, and these recommended travel time periods and travel spot touring routes are then returned to the user terminal.

In this embodiment, if the user-entered travel parameters acquired by the planning server don't include the travel cycle as well as the correlation data between the travel spot types and the travel time periods, then it indicates the user has defined only the travel region for the current travel without setting the travel cycle and the travel spot types. As such, the planning server may base on the predetermined correlation data between the travel regions, the recommended travel time periods, and the recommended travel spot touring routes to determine the corresponding recommended travel time periods as well as recommended travel spot touring routes in the travel region specified in the travel parameters, and then return these recommended travel time periods as well as recommended travel spot touring routes to the user terminal. For example, the mapping relationships between different travel regions, the recommended travel time periods, and the recommended travel spot touring routes may be determined in advance based on the touring popularity and recommended popularity of different travel regions and all the users. Thus, if the user sets only the travel region without setting the parameters such as the correlation data between the travel cycle and the travel spot types and the travel time periods, then the predetermined mapping relationships between different travel regions, the recommended travel time periods, and the recommended travel spot touring routes can be based on to send the corresponding recommended travel time periods and travel spot touring routes to the user, so as to recommend the corresponding specific travel spot touring routes to the user, enhancing the user's travel experience.

As illustrated in FIG. 5, a third embodiment of the disclosure also provides a method of planning a travel route, which further comprises the following steps on the basis of the above embodiments.

In step S50, if the travel parameters include a travel cycle without including the correlation data between a travel region and travel spot types and travel time periods, then the travel cycle specified in the travel parameters is divided into at least one travel time period according to a preset division rule, and the predetermined correlation data between recommended travel regions, recommended travel time periods, and recommended travel spot touring routes is based on to determine and return the recommended travel regions and recommended travel spot touring routes for the divided travel time periods to the user terminal.

In this embodiment, if the user-entered travel parameters acquired by the planning server don't include the travel region as well as the correlation data between the travel spot types and the travel time periods, then it indicates the user has defined only the travel cycle for the current travel without setting the travel region and the travel spot types. Then the planning server may first divide the travel cycle specified in the travel parameters into at least one travel time period according to the preset division rule. For example, if the travel cycle is from 10:00 on May 1, 2016 to 16:00 on May 5, then the travel cycle may be divided into different time periods by different dates, or other division methods can also be used to divide the travel cycle into different travel time periods, but they won't be limited herein.

Then the planning server would base on the predetermined correlation data between the recommended travel regions, the recommended travel time periods, and the recommended travel spot touring routes to determine the corresponding recommended travel regions as well as recommended travel spot touring routes for the divided travel time periods, and further return these recommended travel regions and travel spot touring routes to the user terminal. For example, the mapping relationships between different recommended travel time periods, the recommended travel regions, and the recommended travel spot touring routes may be determined based on the recommended touring popularity of the travel regions and travel spot touring routes corresponding to different travel time periods from all the users. If the user sets only the travel cycle without setting the parameters such as the correlation data between the travel region and the travel spot types and the travel time periods, then the predetermined mapping relationships between different recommended travel time periods, the recommended travel regions, and the recommended travel spot touring routes can be based on to send the corresponding recommended travel regions and travel spot touring routes to the user, so as to recommend the corresponding specific travel spot touring routes to the user, enhancing the user's travel experience.

Further, in other embodiments, the preset computation rule may be as follows.

First calculate a first time interval from a starting time point of each travel time period to a preset lunch starting time point (e.g., 11:40 on each day), as well as second time interval from a preset lunch ending time point (e.g., 12:30 on each day) to an ending time point of the travel time period.

Then, from the travel spots of the travel spot type corresponding to each travel time period and according to a preset selection rule, select a preset number of travel spots as the travel spots to be planned. For example, if the number of travel spots of the travel spot type corresponding to a travel time period is greater than a preset threshold (e.g., 40), then based on the predetermined priorities of the travel spots of each travel spot type, a preset number (e.g., 40) of travel spots may be selected, from the travel spots of the travel spot type corresponding to this travel time period, as the travel spots to be planned. Otherwise if the number of travel spots of the travel spot type corresponding to a travel time period is less than or equal to a preset threshold (e.g., 40), then all the travel spots of the travel spot type corresponding to this travel time period may be selected as the travel spots to be planned.

Thereafter, determine the corresponding touring times of the travel spots to be planned of the travel spot type corresponding to each travel time period based on the mapping relationships between the travel spots of each travel spot type and the touring times, and further compute the consumed times between different travel spots to be planned of the travel spot type corresponding to this travel time period based on the distances between different travel spots of this travel spot type.

Then from the travel spots to be planned of the travel spot type corresponding to each travel time period, select a first set of travel spots to be planned with an accumulated value of the corresponding touring times and consumed times being less than or equal to the first time interval, as well as a second set of travel spots to be planned with an accumulated value of the corresponding touring times and consumed times being less than or equal to the second time interval.

Then match the routes of the selected first set of travel spots to be planned and second set of travel spots to be planned so as to obtain a corresponding travel spot touring route for each travel time period, where on a map a connecting line through the various travel spots in the travel spot touring route is a non-intersecting single line or a single loop connected end to end.

If there are multiple travel spot touring routes matched for a travel time period, then the travel spot touring route with the shortest travel distance may be selected as the travel spot touring route that will be returned to the user terminal.

In this embodiment, the first time interval separating the starting time point of each travel time period from the preset lunch starting time point as well as the second time interval separating the preset lunch ending time point from the ending time point of this travel time period are based on to find a set of travel spots to be planned with an accumulated value of the corresponding touring times and consumed times not exceeding the total travel time of the same travel time period, and then route matching is performed for the various travel spots to be planned in the set of travel spots to be planned so as to obtain an optimal travel spot touring route for each travel time period, providing the user with the most reasonable travel spot touring route and thus enhancing the user's travel experience.

Further, in other embodiments, the preset division rule may be as follows.

If the travel cycle include multiple days (e.g., the travel cycle "10:00 on May 1, 2016 to 16:00 on May 5, 2016" includes 5 days), then the travel cycle may be divided into different time periods by different dates. For example, the travel cycle "10:00 on May 1, 2016 to 16:00 on May 5, 2016" may be divided into time periods "10:00 to 24:00 on May 1, 2016," "00:00 to 24:00 on May 2, 2016," "00:00 to 24:00 on May 3, 2016," "00:00 to 24:00 on May 4, 2016," and "00:00 to 16:00 on May 5, 2016".

If a starting time point of a divided time period (e.g., 10:00 on May 1, 2016) is later than a preset travel starting time point (e.g., 8:30) and an ending time point of the divided time period (e.g., 24:00 on May 1, 2016) is later than a preset travel ending time point (e.g., 18:00), then the starting time point of the divided time period and the preset travel ending time point may be associated to constitute a travel time period (e.g., 10:00 to 18:00 on May 1, 2016).

If a starting time point of a divided time period (e.g., 00:00 on May 2, 2016) is earlier than or equal to a preset travel starting time point (e.g., 8:30), and an ending time point of the divided time period (e.g., 24:00 on May 2, 2016) is later than a preset travel ending time point (e.g., 18:00), then the preset travel starting time point and the preset travel ending time point may be associated to constitute a travel time period (e.g., 8:30 to 18:00 on May 2, 2016).

If a starting time point of a divided time period (e.g., 10:00 on May 1, 2016) is later than a preset travel starting time point (e.g., 8:30) and an ending time point of the divided time period (e.g., 24:00 on May 1, 2016) is earlier than or equal to a preset travel ending time point (e.g., 18:00), then the starting time point of the divided time period and the ending time point of the divided time period may be associated to constitute a travel time period.

If a starting time point of a divided time period is earlier than or equal to a preset travel starting time point and an ending time point of the divided time period is earlier than or equal to a preset travel ending time point, then the preset travel starting time point and the ending time point of the divided time period may be associated to constitute a travel time period.

Figure 6:
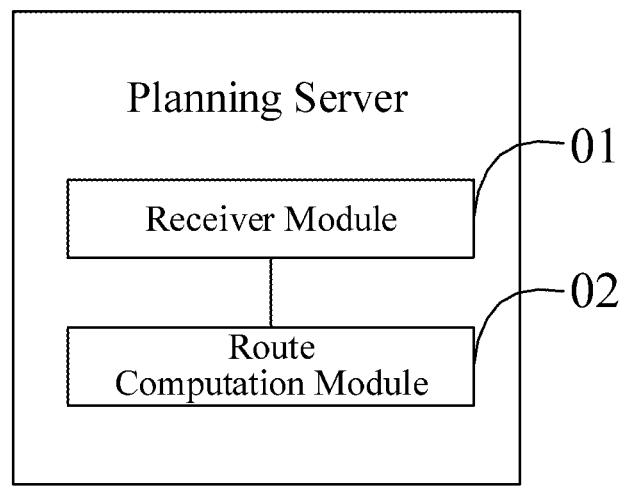
FIG. 6 is an illustrative block diagram of a first embodiment of a planning server in accordance with the disclosure.

It can be seen from the above that the planning server may include at least one computer-readable instruction executable by one or more processors to implement the travel route planning methods according to various embodiments of this application. In some embodiments, the at least one computer-readable instruction may be divided into different logic modules depending on the functions performed by its parts so that the planning server may include a plurality of functional modules that implement different functions or operations. FIG. 6 is an illustrative block diagram of a first embodiment of a planning server in accordance with the disclosure.

In the first embodiment, the planning server may include a receiver module 01 and a route computation module 02, which are detailed as follows.

The receiver module 01 is configured for receiving a travel route planning request carrying travel parameters that is sent by a user terminal.

In this embodiment, when a user needs to plan a travel route, the user can send a travel route planning request carrying travel parameters to the planning server through a user terminal (e.g., a mobile phone, a tablet computer, etc.).

As one implementation, a travel route planning client program may be pre-installed in the user terminal. The user may input the travel parameters through a travel route planning operation interface provided by the travel route planning client program, and then send the travel route planning request carrying the travel parameters to the planning server through the travel route planning client program. As another implementation, a browser system may be pre-installed in the user terminal. The user can access the planning server through the browser system and receive a travel route planning operation interface returned from the planning server to input the travel parameters based on the travel route planning operation interface, and then send the travel route planning request carrying the travel parameters to the planning server through the browser system.

After receiving the travel route planning request carrying the travel parameters sent from the user terminal, the planning server may analyze the travel parameters to determine the travel spots of each travel spot type in the travel region indicated in the travel parameters. For example, the travel parameters may include one or more travel related parameters entered by the user, including but are not limited to the following parameters: the travel region, e.g., city, scenic area, island; travel spot types, e.g., humanity, shopping, food; travel spots of each travel spot type, e.g., the humanity-type travel spots may include museums, naval batteries, memorial halls, amusement parks, zoos, etc., the shopping-type travel spots may include shopping malls, duty-free shops, pedestrian streets, etc., and the food-type travel spots may include food streets, specialty snacks, century-old restaurants, food courts, etc.; and the travel cycle, e.g., "10:00 on May 1, 2016 to 16:00 on May 5", or the like.

In this embodiment, the planning server can directly acquire the specific travel spots of each travel spot type in the travel region indicated in the travel parameters which are entered by the user. Or, after acquiring the travel region and/or each travel spot type specified in the travel parameters entered by the user, the planning server can also perform automatic searching and matching based on the travel region and/or each travel spot type specified in the user-entered travel parameters so as to obtain the corresponding travel spots of each travel spot type, but the disclosure won't be limited thereto.

The route computing module 02 is configured for: if the travel parameters include the correlation data between a travel region and travel spot types and travel time periods, determining the travel spots of each travel spot type in this travel region, and finding the travel spots of the travel spot type corresponding to each travel time period based on the correlation data; computing a corresponding travel spot touring route for each travel time period according to a preset computation rule based on predetermined mapping relationships between the travel spots of each travel spot type with touring times as well as the distances between different travel spots of the travel spot type, and returning the travel spot touring route to the user terminal; otherwise if the travel parameters include a travel region and a travel cycle without including the correlation data between the travel spot types and the travel time periods, determining the travel spots of each travel spot type in this travel region, dividing the travel cycle into at least one travel time period according to a preset division rule, and computing a corresponding travel spot touring route for each travel time period according to a preset computation rule based on predetermined mapping relationships between the travel spots of each travel spot type with touring times as well as the distances between different travel spots of the travel spot type, and returning the travel spot touring route to the user terminal.

If the user-entered travel parameters acquired by the planning server include the correlation data between the travel spot types and the travel time periods, then it indicates that the user has defined in the travel parameters the correspondences between different travel time periods and different travel spot types based on different travel time periods in the travel itinerary. For example, the humanity type may be associated with time period A, e.g., "8:00-18:00 of date", the shopping type may be associated with time period B, while the food type may be associated with period C. Thus, based on the correlation data between different travel spot types and travel time periods defined by the user, the planning server can find the travel spots of the travel spot type corresponding to each travel time period. In this embodiment, the mapping relationships between the travel spots of each travel spot type and the touring times may be determined in advance. For example, the corresponding touring time of each travel spot can be determined in advance according to the actual touring requirements or by performing big data analysis on the touring data of all the users. For a humanity-type travel spot "Museum", for example, the corresponding touring time can be determined in advance and can be "2 hours" and/or "8:00-10:00", etc., but the disclosure won't be limited thereto.

Therefore, based on the predetermined mapping relationships between the various travel spots of each travel spot type and the touring times as well as the distances between different travel spots of the travel spot type, the touring times of the various travel spots and the distances between different travel spots are comprehensively considered to compute the corresponding travel spot touring route for each travel time period according to a preset computation rule. For example, based on the touring time allowed by a same travel time period, a number of travel spots, the total touring time of which does not exceed the allowable touring time and which won't end up in an exceedingly long itinerary or crossings, can be selected. Then, a travel spot touring route through these selected travel spots can be computed for this travel time period, where, however, other computation methods can of course also be used to compute the corresponding travel spot touring route for each travel time period, but they won't be limited herein.

After computing the travel spot touring route for each travel time period, the planning server may then return the computed travel spot touring route for each travel time period to the user terminal so that the user can refer to the computed travel spot touring route to carry out corresponding tour route planning for each travel time period, and thereby arrange an efficient tour plan.

If the user-entered travel parameters acquired by the planning server include no correlation data between the travel spot types and the travel time periods, indicating the user hasn't divided the travel cycle into different travel time periods, then the planning server may divide the travel cycle specified in the travel parameters into at least one travel time period according to a preset division rule. For example, if the travel cycle is from 10:00 May 1, 2016 to 16:00 May 5, then the travel cycle may be divided into different time periods by different dates, or other division methods can also be used to divide the travel cycle into different travel time periods, but they won't be limited herein.

In this embodiment, the mapping relationships between the travel spots of each travel spot type and the touring times may be determined in advance. For example, the corresponding touring time of each travel spot can be determined in advance according to the actual touring requirements or by performing big data analysis on the touring data of all the users. For a humanity-type travel spot "museum", for example, the corresponding touring time can be determined in advance and can be "2 hours" and/or "8:00-10:00", etc., but the disclosure won't be limited thereto.

Therefore, based on the predetermined mapping relationships between the various travel spots of each travel spot type and the touring times as well as the distances between different travel spots of the travel spot type, the touring times of the various travel spots and the distances between different travel spots are comprehensively considered to compute the corresponding travel spot touring route for each travel time period according to a preset computation rule, and these travel spot touring routes are further taken as the corresponding travel spot touring route for each travel time period obtained through the division of the travel cycle. For example, based on the touring time allowed by a same travel time period, a number of travel spots, the total touring time of which does not exceed the allowable touring time and which won't end up in an exceedingly long itinerary or crossings, can be selected. Then, a travel spot touring route through these selected travel spots can be computed for this travel time period, where, however, other computation methods can of course also be used to compute the corresponding travel spot touring route for each travel time period, but they won't be limited herein.

After computing the travel spot touring route corresponding to each travel time period, the planning server may then return the computed travel spot touring route for each travel time period to the user terminal so that the user can refer to the computed travel spot touring route to carry out corresponding tour route planning for each travel time period, and thereby arrange an efficient tour plan.

According to this embodiment, the planning server can base on the travel parameters included in the user's travel route planning request to determine the travel spots of each travel spot type of the travel region indicated in the travel parameters, and compute a corresponding travel spot touring route for each travel time period according to a preset computation rule based on predetermined mapping relationships between the travel spots of each travel spot type with touring times as well as the distances between different travel spots of the travel spot type, and further return the computed travel spot touring route for each travel time period to the user terminal. Since for the travel spot type corresponding to each travel time period, the travel spots the user is going to tour and the touring time of each travel spot as well as the distances between different travel spots are comprehensively considered in computation of the corresponding travel spot touring route for each travel time period, a specific travel spot touring route for each travel time period during the user's travel can be recommended to user, providing the user with reasonable and detailed travel route plans and thus improving the user's travel experience.

Figure 7:
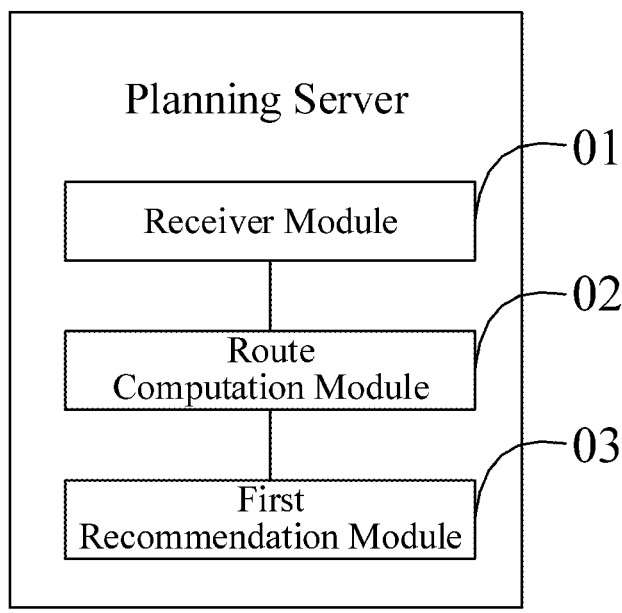
FIG. 7 is an illustrative block diagram of a second embodiment of a planning server in accordance with the disclosure.

FIG. 7 shows an illustrative block diagram of a second embodiment of a planning server according to the disclosure. The planning server further comprises a first recommendation module 03, on basis of the above embodiment.

The first recommendation module 03 is configured for: if the travel parameters include a travel region without including a travel cycle and the correlation data between travel spot types and travel time periods, basing on the predetermined correlation data between travel regions, recommended travel time periods, and recommended travel spot touring routes to determine corresponding recommended travel time periods as well as recommended travel spot touring routes in the travel region specified in the travel parameters, and returning these recommended travel time periods and travel spot touring routes to the user terminal.

In this embodiment, if the user-entered travel parameters acquired by the planning server don't include the travel cycle as well as the correlation data between the travel spot types and the travel time periods, then it indicates the user has defined only the travel region for the current travel without setting the travel cycle and the travel spot types. As such, the planning server may base on the predetermined correlation data between the travel regions, the recommended travel time periods, and the recommended travel spot touring routes to determine the corresponding recommended travel time periods as well as recommended travel spot touring routes in the travel region specified in the travel parameters, and then return these recommended travel time periods and travel spot touring routes to the user terminal. For example, the mapping relationships between different travel regions, the recommended travel time periods, and the recommended travel spot touring routes may be determined in advance based on the touring popularity and recommended popularity of different travel regions and all the users. Thus, if the user sets only the travel region without setting the parameters such as the correlation data between the travel cycle and the travel spot types and the travel time periods, then the predetermined mapping relationships between different travel regions, the recommended travel time periods, and the recommended travel spot touring routes may be based on to send the corresponding recommended travel time periods and travel spot touring routes to the user, so as to recommend the corresponding specific travel spot touring routes to the user, enhancing the user's travel experience.

Figure 8:
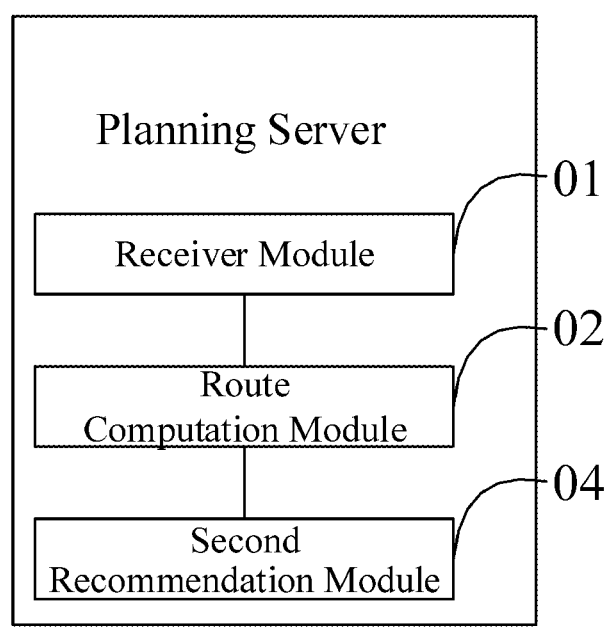
FIG. 8 is an illustrative block diagram of a third embodiment of a planning server in accordance with the disclosure.

FIG. 8 shows an illustrative block diagram of a third embodiment of a planning server according to the disclosure. The planning server further comprises a second recommendation module 04, on basis of the above embodiment.

The second recommendation module 04 is configured for: if the travel parameters include a travel cycle without including the correlation data between a travel region and travel spot types and travel time periods, dividing the travel cycle specified in the travel parameters into at least one travel time period according to a preset division rule, and basing on the predetermined correlation data between recommended travel regions, recommended travel time periods, and recommended travel spot touring routes to determine and return the corresponding recommended travel regions and recommended travel spot touring routes for the divided travel time periods to the user terminal.

In this embodiment, if the user-entered travel parameters acquired by the planning server don't include the travel region as well as the correlation data between the travel spot types and the travel time periods, then it indicates the user has defined only the travel cycle for the current travel without setting the travel region and the travel spot types. As such, the planning server may first divide the travel cycle specified in the travel parameters into at least one travel time period according to a preset division rule. For example, if the travel cycle is from 10:00 May 1, 2016 to 16:00 May 5, then the travel cycle may be divided into different time periods by different dates, or other division methods can also be used to divide the travel cycle into different travel time periods, but they won't be limited herein.

Then the planning server may base on the predetermined correlation data between the recommended travel regions, the recommended travel time periods, and the recommended travel spot touring routes to determine the corresponding recommended travel regions as well as recommended travel spot touring routes for the divided travel time periods, and further return these recommended travel regions and travel spot touring routes to the user terminal. For example, the mapping relationships between different recommended travel time periods, the recommended travel regions, and the recommended travel spot touring routes may be determined based on the recommended touring popularity of the travel regions and travel spot touring routes corresponding to different travel time periods from all the users. If the user sets only the travel cycle without setting the parameters such as the correlation data between the travel region and the travel spot types and the travel time periods, then the predetermined mapping relationships between different recommended travel time periods, the recommended travel regions, and the recommended travel spot touring routes can be based on to send the corresponding recommended travel regions and travel spot touring routes to the user, so as to recommend the corresponding specific travel spot touring routes to the user, enhancing the user's travel experience.

Further, in other embodiments, the preset computation rule may be as follows.

First calculate a first time interval from a starting time point of each travel time period to a preset lunch starting time point (e.g., 11:40 on each day), as well as second time interval from a preset lunch ending time point (e.g., 12:30 on each day) to an ending time point of the travel time period.

Then, from the travel spots of the travel spot type corresponding to each travel time period and according to a preset selection rule, select a preset number of travel spots as the travel spots to be planned. For example, if the number of travel spots of the travel spot type corresponding to a travel time period is greater than a preset threshold (e.g., 40), then based on the predetermined priorities of the travel spots of each travel spot type, a preset number (e.g., 40) of travel spots may be selected, from the travel spots of the travel spot type corresponding to this travel time period, as the travel spots to be planned. Otherwise if the number of travel spots of the travel spot type corresponding to a travel time period is less than or equal to a preset threshold (e.g., 40), then all the travel spots of the travel spot type corresponding to this travel time period may be selected as the travel spots to be planned.

Thereafter, determine the corresponding touring times of the travel spots to be planned of the travel spot type corresponding to each travel time period based on the mapping relationships between the travel spots of each travel spot type and the touring times, and further compute the consumed times between different travel spots to be planned of the travel spot type corresponding to this travel time period based on the distances between different travel spots of this travel spot type.

Then from the travel spots to be planned of the travel spot type corresponding to each travel time period, select a first set of travel spots to be planned with an accumulated value of the corresponding touring times and consumed times being less than or equal to the first time interval, as well as a second set of travel spots to be planned with an accumulated value of the corresponding touring times and consumed times being less than or equal to the second time interval.

Then match the routes of the selected first set of travel spots to be planned and second set of travel spots to be planned so as to obtain a corresponding travel spot touring route for each travel time period, where on a map a connecting line through the various travel spots in the travel spot touring route is a non-intersecting single line or a single loop connected end to end.

If there are multiple travel spot touring routes matched for a travel time period, then the travel spot touring route with the shortest travel distance may be selected as the travel spot touring route that will be returned to the user terminal.

In this embodiment, the first time interval separating the starting time point of each travel time period from the preset lunch starting time point as well as the second time interval separating the preset lunch ending time point from the ending time point of the travel time period are based on to find a set of travel spots to be planned with an accumulated value of the corresponding touring times and the consumed times not exceeding the total travel time of the same travel time period, and then route matching is performed for the various travel spots to be planned in the set of travel spots to be planned so as to obtain an optimal travel spot touring route for each travel time period, providing the user with the most reasonable travel spot touring route and thus enhancing the user's travel experience.

Further, in other embodiments, the preset division rule may be as follows.

If the travel cycle include multiple days (e.g., the travel cycle "10:00 on May 1, 2016-16:00 on May 5, 2016" includes 5 days), then the travel cycle may be divided into different time periods by different dates. For example, the travel cycle "10:00 on May 1, 2016 to 16:00 on May 5, 2016" may be divided into time periods "10:00 to 24:00 on May 1, 2016," "00:00 to 24:00 on May 2, 2016," "00:00 to 24:00 on May 3, 2016," "00:00 to 24:00 on May 4, 2016," and "00:00 to 16:00 on May 5, 2016".

If a starting time point of a divided time period (e.g., 10:00 on May 1, 2016) is later than a preset travel starting time point (e.g., 8:30) and an ending time point of the divided time period (e.g., 24:00 on May 1, 2016) is later than a preset travel ending time point (e.g., 18:00), then the starting time point of the divided time period and the preset travel ending time point may be associated to constitute a travel time period (e.g., 10:00 to 18:00 on May 1, 2016).

If a starting time point of a divided time period (e.g., 00:00 on May 2, 2016) is earlier than or equal to a preset travel starting time point (e.g., 8:30), and an ending time point of the divided time period (e.g., 24:00 on May 2, 2016) is later than a preset travel ending time point (e.g., 18:00), then the preset travel starting time point and the preset travel ending time point may be associated to constitute a travel time period (e.g., 8:30 to 18:00 on May 2, 2016).

If a starting time point of a divided time period (e.g., 10:00 on May 1, 2016) is later than a preset travel starting time point (e.g., 8:30) and an ending time point of the divided time period (e.g., 24:00 on May 1, 2016) is earlier than or equal to a preset travel ending time point (e.g., 18:00), then the starting time point of the divided time period and the ending time point of the divided time period may be associated to constitute a travel time period.

if a starting time point of a divided time period is earlier than or equal to a preset travel starting time point and an ending time point of the divided time period is earlier than or equal to a preset travel ending time point, then the preset travel starting time point and the ending time point of the divided time period may be associated to constitute a travel time period.

The foregoing numbering of embodiments is intended for illustrative purposes only, and is not indicative of the pros and cons of these embodiments. By the description of the foregoing embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disc) and may include multiple instructions that, when executed, can cause a computing device (e.g., a mobile phone, a computer, a server, a network device), to execute the methods described in the various embodiments of the disclosure.

The foregoing description merely depicts some exemplary embodiments and therefore is not intended as limiting the patentable scope of the disclosure. Any equivalent configurational or flow transformations that are made taking advantage of the disclosure and that are used directly or indirectly in any other related technical field shall all fall in the scope of protection of the disclosure.

What is claimed is:

1. A method of planning a travel route, comprising:
a planning server receiving a travel route planning request carrying a plurality of travel parameters sent by a user terminal;
if the plurality of travel parameters include correlation data between a travel region and a plurality of travel spot types and a plurality of travel time periods, the planning server determining a plurality of travel spots of each travel spot type in the travel region, and finding the plurality of travel spots of the travel spot type corresponding to each travel time period based on the correlation data; and the planning server computing a corresponding travel spot touring route for each travel time period according to a preset computation rule based on a plurality of predetermined mapping relationships between the plurality of travel spots of each travel spot type, a plurality of touring times and a plurality of distances between different travel spots of the travel spot type, and the planning server returning the travel spot touring route to the user terminal; or
if the plurality of travel parameters include the travel region and a travel cycle without including the correlation data between the plurality of travel spot types and the plurality of travel time periods, the planning server determining the plurality of travel spots of each travel spot type in the travel region, dividing the travel cycle into at least one travel time period according to a preset division rule, and the planning server computing the corresponding travel spot touring route for each travel time period according to a preset computation rule based on a plurality of predetermined mapping relationships between the plurality of travel spots of each travel spot type, a plurality of touring times and the plurality of distances between different travel spots of the travel spot type, and the planning server returning the travel spot touring route to the user terminal;
wherein the preset computation rule comprises:

calculating a first time interval separating a starting time point of each travel time period from a preset lunch starting time point, calculating a second time interval separating a preset lunch ending time point from an ending time point of the travel time period;
selecting a preset number of travel spots as the plurality of travel spots to be planned from the travel spots of the travel spot type corresponding to each travel time period according to a preset selection rule;
determining the plurality of touring times of the plurality of travel spots to be planned of the travel spot type corresponding to each travel time period based on the plurality of mapping relationships between the plurality of travel spots of each travel spot type and the plurality of touring times, and computing a plurality of consumed times between different travel spots to be planned of the travel spot type corresponding to the travel time period based on the plurality of distances between different travel spots of the travel spot type;
selecting a first set of travel spots to be planned with an accumulated value of the corresponding touring times and the plurality of consumed times being less than or equal to the first time interval, and a second set of travel spots to be planned with an accumulated value of the plurality of corresponding touring times and the plurality of consumed times being less than or equal to the second time interval, wherein the first set of travel spots and the second set of travel spots are selected from the travel spots to be planned of the travel spot type corresponding to each travel time period; and
matching a plurality of routes of the first set of travel spots and the second set of travel spots to obtain the corresponding travel spot touring route for each travel time period.

2. The method of claim 1, further comprising:
if the plurality of travel parameters include the travel region without including the correlation data between the travel cycle and the plurality of travel spot types and the plurality of travel time periods, basing on predetermined correlation data between the plurality of travel regions, a plurality of recommended travel time periods, and a plurality of recommended travel spot touring routes to determine a plurality of corresponding recommended travel time periods and the plurality of recommended travel spot touring routes for the travel region specified in the plurality of travel parameters, and returning the plurality of recommended travel time periods and the plurality of recommended travel spot touring routes to the user terminal.

3. The method of claim 1, further comprising:
if the plurality of travel parameters include a travel cycle without including the correlation data between a travel region and the plurality of travel spot types and the plurality of travel time periods, dividing the travel cycle specified in the plurality of travel parameters into at least one travel time period according to the preset division rule, and basing on predetermined correlation data between the plurality of recommended travel regions, a plurality of recommended travel time periods, and a plurality of recommended travel spot touring routes to determine and return a plurality of corresponding recommended travel regions and the plurality of recommended travel spot touring routes for the plurality of divided travel time periods to the user terminal.

4. The method of claim 1, wherein the preset division rule comprises:

if the travel cycle includes a plurality of days, dividing the travel cycle into different time periods by different dates;
if a starting time point of a divided time period is later than a preset travel starting time point and an ending time point of the divided time period is later than a preset travel ending time point, associating the starting time point of the divided time period and the preset travel ending time point to constitute the travel time period;
if the starting time point of the divided time period is earlier than or equal to the preset travel starting time point and the ending time point of the divided time period is later than the preset travel ending time point, associating the preset travel starting time point with the present travel ending time point to constitute the travel time period;
if the starting time point of the divided time period is later than the preset travel starting time point and the ending time point of the divided time period is earlier than or equal to the preset travel ending time point, associating the starting time point of the divided time period and the ending time point of the divided time period to constitute the travel time period; and
if the starting time point of the divided time period is earlier than or equal to the preset travel starting time point and the ending time point of the divided time period is earlier than or equal to the preset travel ending time point, associating the preset travel starting time point with the ending time point of the divided time period to constitute travel time period.

5. A planning server, comprising a memory and a processor coupled to the memory, wherein the memory stores at least one computer-readable instruction executable by the processor to perform the following operations:
receiving a travel route planning request carrying a plurality of travel parameters sent by a user terminal;
if the plurality of travel parameters include correlation data between a travel region and a plurality of travel spot types and a plurality of travel time periods, determining a plurality of travel spots of each travel spot type in the travel region, and finding the plurality of travel spots of the travel spot type corresponding to each travel time period based on the correlation data; and computing a corresponding travel spot touring route for each travel time period according to a preset computation rule based on a plurality of predetermined mapping relationships between plurality of the travel spots of each travel spot type and touring times as well as distances between different travel spots of the travel spot type, and returning the travel spot touring route to the user terminal; or
if the plurality of travel parameters include the travel region and a travel cycle without including the correlation data between the plurality of travel spot types and the plurality of travel time periods, determining the plurality of travel spots of each travel spot type in the travel region, dividing the travel cycle into at least one travel time period according to a preset division rule, and computing the corresponding travel spot touring route for each travel time period according to a preset computation rule based on a plurality of predetermined mapping relationships between the plurality of travel spots of each travel spot type, a plurality of touring times and the plurality of distances between different travel spots of the travel spot type, and returning the travel spot touring route to the user terminal;

wherein the preset computation rule comprises:
calculating a first time interval separating a starting time point of each travel time period from a preset lunch starting time point, calculating a second time interval separating a preset lunch ending time point from an ending time point of the travel time period;
selecting a preset number of travel spots as the plurality of travel spots to be planned from the travel spots of the travel spot type corresponding to each travel time period according to a preset selection rule;
determining the plurality of touring times of the plurality of travel spots to be planned of the travel spot type corresponding to each travel time period based on the plurality of mapping relationships between the plurality of travel spots of each travel spot type and the plurality of touring times, and computing a plurality of consumed times between different travel spots to be planned of the travel spot type corresponding to the travel time period based on the plurality of distances between different travel spots of the travel spot type;
selecting a first set of travel spots to be planned with an accumulated value of the corresponding touring times and the plurality of consumed times being less than or equal to the first time interval, and a second set of travel spots to be planned with an accumulated value of the plurality of corresponding touring times and the plurality of consumed times being less than or equal to the second time interval, wherein the first set of travel spots and the second set of travel spots are selected from the travel spots to be planned of the travel spot type corresponding to each travel time period; and
matching a plurality of routes of the first set of travel spots and the second set of travel spots to obtain the corresponding travel spot touring route for each travel time period.

6. The planning server of claim 5, wherein the at least one computer-readable instruction is executable by the processor to further perform the following operations:
if the plurality of travel parameters include the travel region without including the correlation data between the travel cycle and the travel spot types and the plurality of travel time periods, basing on predetermined correlation data between the plurality of travel regions, a plurality of recommended travel time periods, and a plurality of recommended travel spot touring routes to determine a plurality of corresponding recommended travel time periods and recommended travel spot touring routes for the travel region specified in the travel parameters, and returning the plurality of recommended travel time periods and the plurality of travel spot touring routes to the user terminal.

7. The planning server of claim 5, wherein the at least one computer-readable instruction is executable by the processor to further perform the following operations:
if the plurality of travel parameters include a travel cycle without including the correlation data between a travel region and the plurality of travel spot types and the plurality of travel time periods, dividing the travel cycle specified in the plurality of travel parameters into at least one travel time period according to the preset division rule, and basing on predetermined correlation data between the plurality of recommended travel regions, a plurality of recommended travel time periods, and a plurality of recommended travel spot touring routes to determine and return a plurality of corresponding recommended travel regions and the plurality of recommended travel spot touring routes for the plurality of divided travel time periods to the user terminal.

8. The planning server of claim 5, wherein the preset division rule comprises:
if the travel cycle includes a plurality of days, dividing the travel cycle into different time periods by different dates;
if a starting time point of a divided time period is later than a preset travel starting time point and an ending time point of the divided time period is later than a preset travel ending time point, associating the starting time point of the divided time period and the preset travel ending time point to constitute the travel time period;
if the starting time point of the divided time period is earlier than or equal to the preset travel starting time point and the ending time point of the divided time period is later than the preset travel ending time point, associating the preset travel starting time point with the present travel ending time point to constitute the travel time period;
if the starting time point of the divided time period is later than the preset travel starting time point and the ending time point of the divided time period is earlier than or equal to the preset travel ending time point, associating the starting time point of the divided time period and the ending time point of the divided time period to constitute the travel time period; and
if the starting time point of the divided time period is earlier than or equal to the preset travel starting time point and the ending time point of the divided time period is earlier than or equal to the preset travel ending time point, associating the preset travel starting time point with the ending time point of the divided time period to constitute the travel time period.

9. A computer-readable storage medium storing at least one computer instruction executable by a processor to perform the following operations:
receiving a travel route planning request carrying a plurality of travel parameters sent by a user terminal;
if the plurality of travel parameters include correlation data between a travel region and a plurality of travel spot types and a plurality of travel time periods, determining a plurality of travel spots of each travel spot type in the travel region, and finding the plurality of travel spots of the travel spot type corresponding to each travel time period based on the correlation data; and computing a corresponding travel spot touring route for each travel time period according to a preset computation rule based on a plurality of predetermined mapping relationships between the plurality of travel spots of each travel spot type, a plurality of touring times and a plurality of distances between different travel spots of the travel spot type, and returning the travel spot touring route to the user terminal; or
if the plurality of travel parameters include the travel region and a travel cycle without including the correlation data between the plurality of travel spot types and the plurality of travel time periods, determining the plurality of travel spots of each travel spot type in the travel region, dividing the travel cycle into at least one travel time period according to a preset division rule, and computing the corresponding travel spot touring route for each travel time period according to a preset computation rule based on a plurality of predetermined mapping relationships between the plurality of travel spots of each travel spot type, a plurality of touring times and the plurality of distances between different travel spots of the travel spot type, and returning the travel spot touring route to the user terminal;
wherein the preset computation rule comprises:
calculating a first time interval separating a starting time point of each travel time period from a preset lunch starting time point, calculating a second time interval separating a preset lunch ending time point from an ending time point of the travel time period;
selecting a preset number of the plurality of travel spots as the travel spots to be planned from the travel spots of the travel spot type corresponding to each travel time period according to a preset selection rule;
determining the plurality of touring times of the plurality of travel spots to be planned of the travel spot type corresponding to each travel time period based on the plurality of mapping relationships between the plurality of travel spots of each travel spot type and the plurality of touring times, and computing a plurality of consumed times between different travel spots to be planned of the travel spot type corresponding to the travel time period based on the plurality of distances between different travel spots of the travel spot type;
selecting a first set of travel spots to be planned with an accumulated value of the corresponding touring times and the plurality of consumed times being less than or equal to the first time interval, and a second set of travel spots to be planned with an accumulated value of the plurality of corresponding touring times and the plurality of consumed times being less than or equal to the second time interval, wherein the first set of travel spots and the second set of travel spots are selected from the travel spots to be planned of the travel spot type corresponding to each travel time period; and
matching a plurality of routes of the first set of travel spots and the second set of travel spots to obtain the corresponding travel spot touring route for each travel time period.

10. The computer-readable storage medium of claim 9, wherein the at least one computer-readable instruction is executable by the processor to further perform the following operations:
if the plurality of travel parameters include the travel region without including the correlation data between the travel cycle and the plurality of travel spot types and the plurality of travel time periods, basing on predetermined correlation data between plurality of travel regions, a plurality of recommended travel time periods, and a plurality of recommended travel spot touring routes to determine a plurality of corresponding recommended travel time periods and the plurality of recommended travel spot touring routes for the travel region specified in the plurality of travel parameters, and returning the plurality of recommended travel time periods and the plurality of recommended travel spot touring routes to the user terminal.

11. The computer-readable storage medium of claim 9, wherein the at least one computer-readable instruction is executable by the processor to further perform the following operations:
if the plurality of travel parameters include a travel cycle without including the correlation data between a travel region and the plurality of travel spot types and the plurality of travel time periods, then dividing the travel cycle specified in the plurality of travel parameters into at least one travel time period according to the preset division rule, and basing on predetermined correlation data between the plurality of recommended travel regions, a plurality of recommended travel time periods, and a plurality of recommended travel spot touring routes to determine and return a plurality of corresponding recommended travel regions and the plurality of recommended travel spot touring routes for the plurality of divided travel time periods to the user terminal.

12. The computer-readable storage medium of claim 9, wherein the preset division rule comprises:

if the travel cycle includes a plurality of days, dividing the travel cycle into different time periods by different dates;

if a starting time point of a divided time period is later than a preset travel starting time point and an ending time point of the divided time period is later than a preset travel ending time point, associating the starting time point of the divided time period and the preset travel ending time point to constitute the travel time period;

if the starting time point of the divided time period is earlier than or equal to the preset travel starting time point and the ending time point of the divided time period is later than the preset travel ending time point, associating the preset travel starting time point with the present travel ending time point to constitute the travel time period;

if the starting time point of the divided time period is later than the preset travel starting time point and the ending time point of the divided time period is earlier than or equal to the preset travel ending time point, associating the starting time point of the divided time period and the ending time point of the divided time period to constitute the travel time period; and if the starting time point of the divided time period is earlier than or equal to the preset travel starting time point and the ending time point of the divided time period is earlier than or equal to the preset travel ending time point, associating the preset travel starting time point with the ending time point of the divided time period to constitute the travel time period.

* * * * *